April 15, 1958  T. J. LAASE  2,830,703
DRILL SORTING AND SIZING MACHINE
Filed Jan. 12, 1955  3 Sheets-Sheet 1
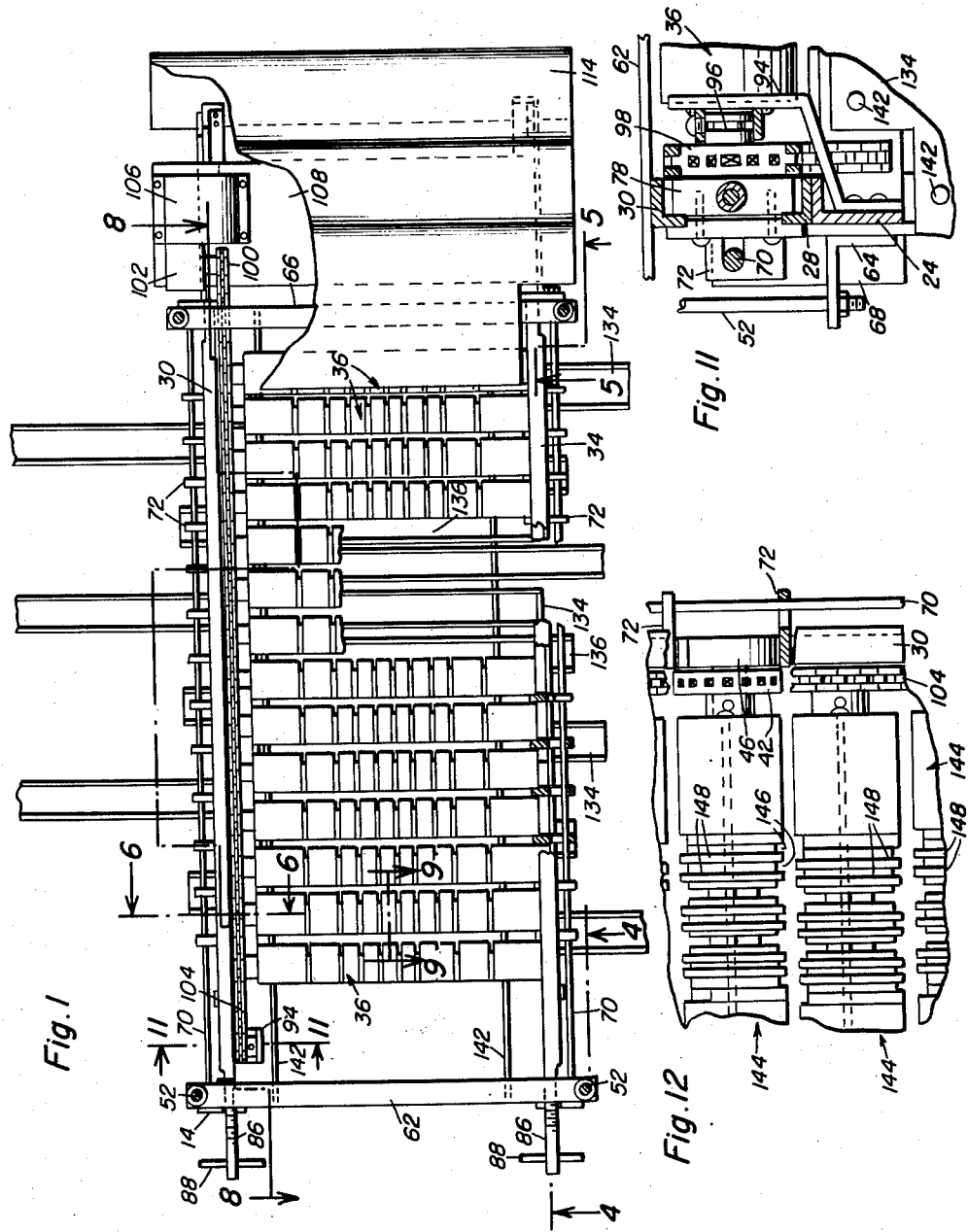
Theodore J. Laase
INVENTOR.

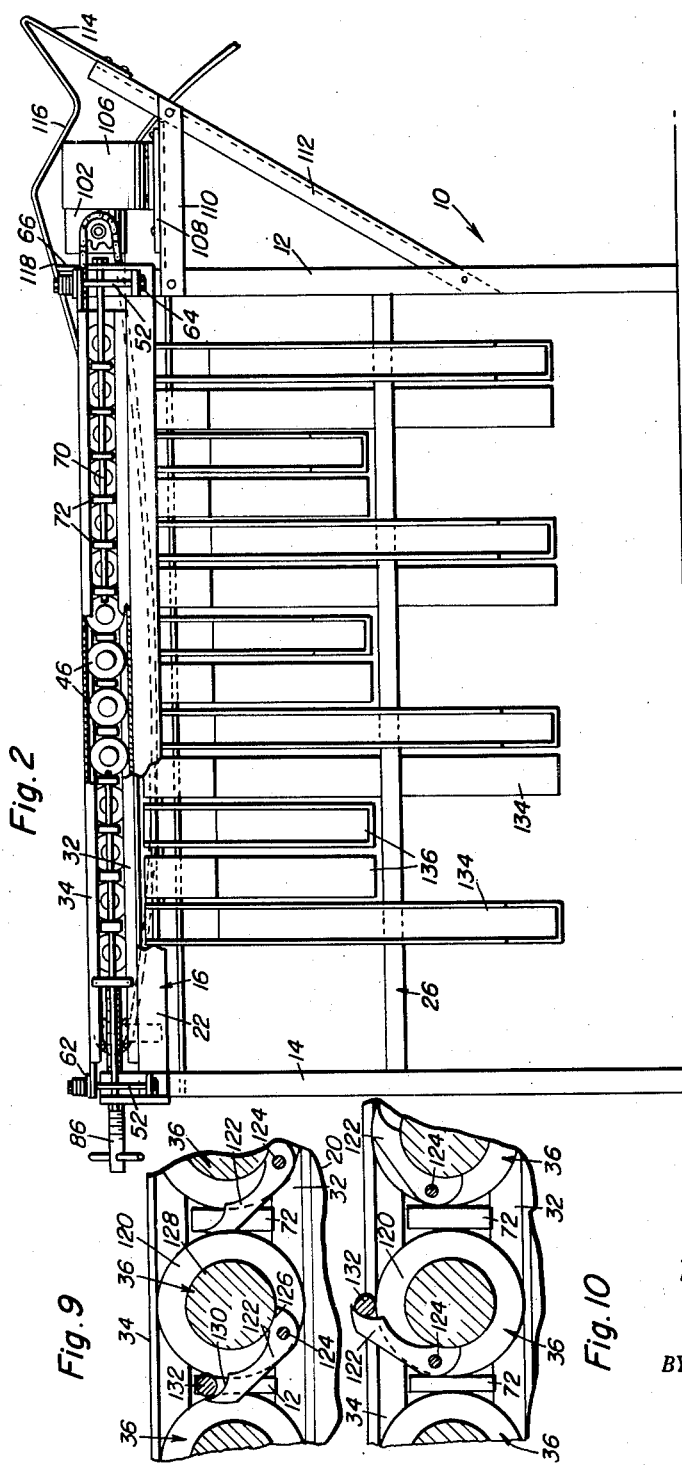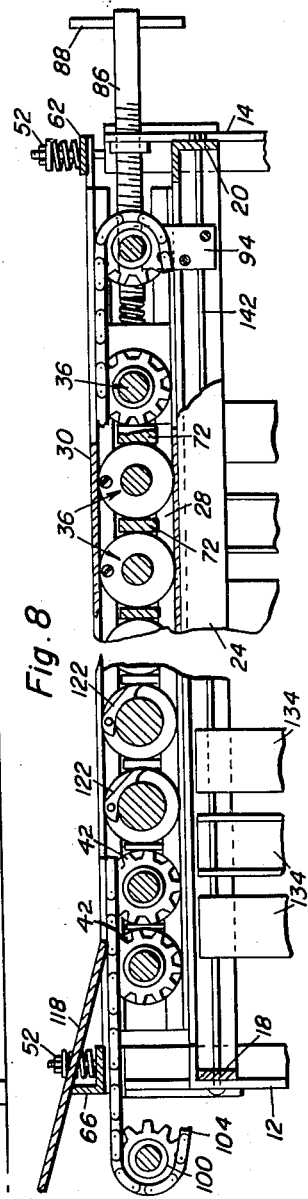
Theodore J. Laase
INVENTOR.

April 15, 1958  T. J. LAASE  2,830,703
DRILL SORTING AND SIZING MACHINE
Filed Jan. 12, 1955  3 Sheets-Sheet 3
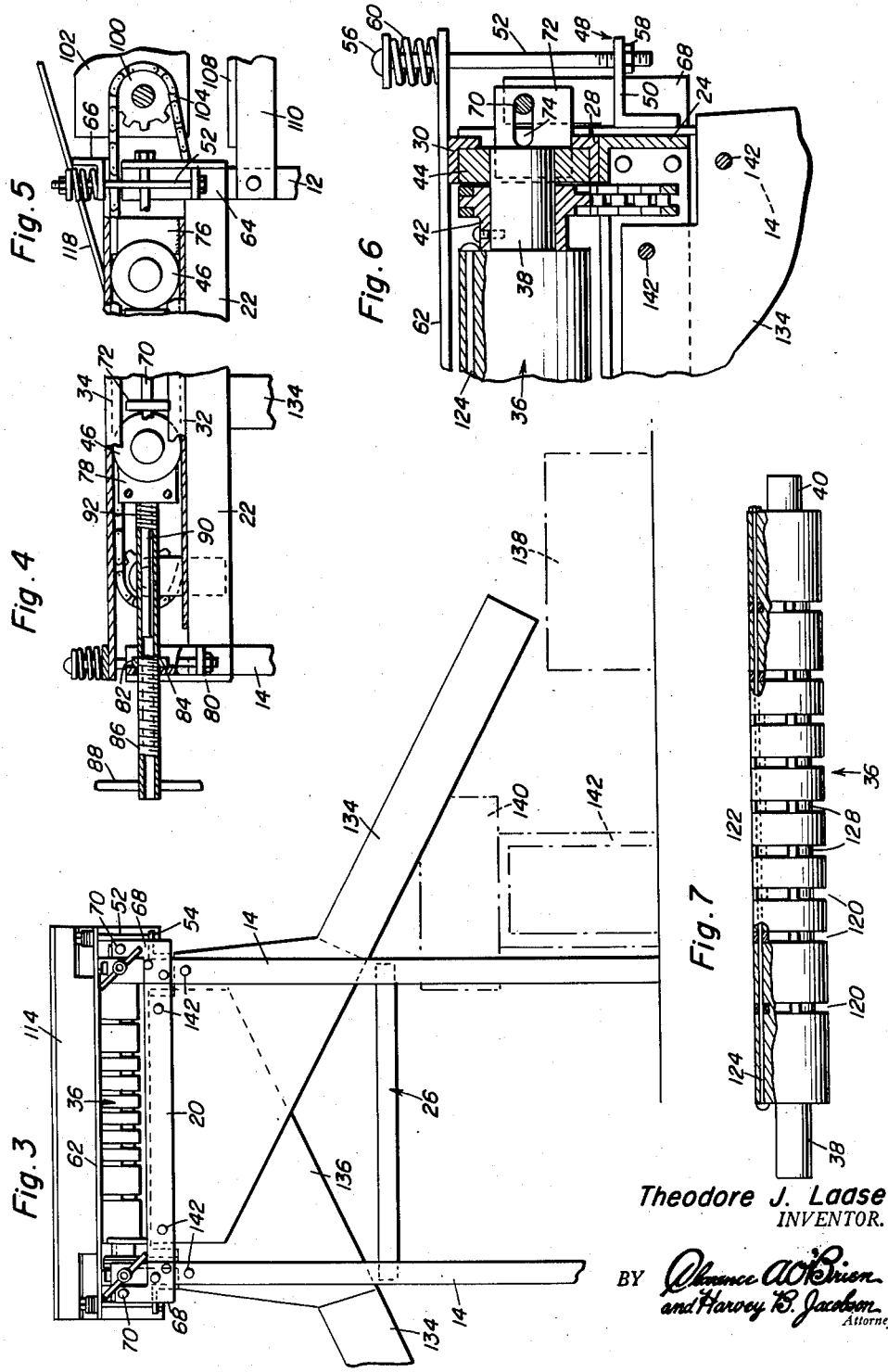
Theodore J. Laase
INVENTOR.

United States Patent Office 2,830,703
Patented Apr. 15, 1958

2,830,703

DRILL SORTING AND SIZING MACHINE

Theodore J. Laase, Culver City, Calif.

Application January 12, 1955, Serial No. 481,336

8 Claims. (Cl. 209—106)

This invention relates in general to new and useful improvements in sorting and sizing machines, and more specifically to a sorting and sizing machine particularly adapted for use in conjunction with drills and rods.

A primary object of this invention is to provide an improved drill sizing and sorting machine which is so constructed whereby drills or rods of constant cross-section may be placed in one end of the machine and the drills or rods will be progressively fed the length of the machine with the drills dropping through the machine at proper points therealong according to their sizes.

Another object of this invention is to provide an improved drill sorting and sizing machine which is so constructed whereby the relative sizes of drills to be sorted may be quickly and easily changed without dismantling the machine.

Another object of this invention is to provide a novel mounting for drill sorting and sizing rollers, the rollers having ends thereof carried by mounting blocks slidably mounted in a supporting frame and spacers pivotally carried by a rod for selective movement therealong, the spacers being selectively positionable between the mounting blocks of the rollers whereby the space between rollers may be varied so that the desired drills may be sized by passing through the spaces between adjacent rollers.

A further object of this invention is to provide an improved sorting and sizing roller assembly, the roller assembly including at least a pair of rollers spaced for permitting the passage of a desired size of drill therebetween, each of the rollers being provided with a finger gravity operated to move into the space as it passes relative thereto so as to lift a drill seated in alignment with the space on the two adjacent rollers over the associated roller into the space between the associated roller and the next adjacent roller.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the drill sorting and sizing machine which is the subject of this invention and shows the general details thereof, portions of the machine being broken away in order to clearly illustrate both the mounting of a drive motor for the machine and drill receiving chutes;

Figure 2 is a side elevational view of the machine of Figure 1 and shows the general arrangement of the chutes beneath the sorting mechanism of the machine, a portion of the supporting frame of the supporting mechanism being broken away and shown in section in order to illustrate the relationship of rollers mounted therein;

Figure 3 is an end elevational view of the machine as viewed from the left in Figure 1 and further shows the relationship of chutes for receiving assorted drills;

Figure 4 is an enlarged fragmentary vertical sectional view taken substantially on the plane indicated by the section line 4—4 of Figure 1 and shows the details of a claim and a clamp block for retaining the rollers of the machine in adjusted positions;

Figure 5 is an enlarged fragmentary vertical sectional view taken substantially upon the plane indicated by the section line 5—5 of Figure 1 and shows the relationship of a mounting block or bearing of an endmost roller with respect to a seat provided therefor;

Figure 6 is an enlarged fragmentary transverse vertical sectional view taken substantially upon the plane indicated by the section line 6—6 of Figure 1 and shows the details of the supporting frame and the manner in which a mounting bearing is mounted therein, also being illustrated is the mounting for a spacer intended to be disposed between adjacent mounting bearings;

Figure 7 is an enlarged plan view of one of the rollers with portions thereof broken away and shown in section in order to clearly illustrate the manner in which fingers carried by the roller are pivotally mounted on a rod extending longitudinally of the roller;

Figure 8 is an enlarged longitudinal vertical sectional view taken substantially upon the plane indicated by the section line 8—8 of Figure 1 and shows the relationship of the drill sorting and sizing rollers and the means for driving the same, an intermediate portion of the machine being broken away;

Figure 9 is an enlarged fragmentary longitudinal vertical sectional view taken substantially upon the plane indicated by the section line 9—9 of Figure 1 and shows the relationship of a finger of one of the rollers with respect to a drill disposed between the one roller and an adjacent roller immediately prior to the movement of the drill from therebetween by the fingers;

Figure 10 is an enlarged fragmentary vertical sectional view similar to Figure 9 and shows the finger and the drill in a rotated position;

Figure 11 is an enlarged fragmentary transverse vertical sectional view taken substantially upon the plane indicated by the section line 11—11 of Figure 1 and shows the mounting for an idler sprocket of the drive chain together with the general details of the clamp block at one side of the supporting frame; and Figure 12 is a fragmentary top plan view on an enlarged scale of the machine employing a modified form of roller construction.

Referring now to the drawings in detail, it will be seen that the drill sorting and sizing machine, which is the subject of this invention, includes a supporting frame which is referred to in general by the reference numeral 10. The supporting frame 10 includes a first pair of legs 12 at one end thereof. A second pair of transversely spaced legs 14 are disposed at the opposite end thereof. The upper ends of the legs 12 and 14, which are disposed in rectangular relation, are retained in place by a rectangular frame 16 secured thereto adjacent the upper ends thereof. The rectangular frame 16 is formed of angle members and includes an upper transverse frame member 18 extending between the legs 12 and an upper transverse frame member 20 extending between the legs 14. The frame 16 also includes longitudinal frame members 22 and 24 disposed at opposite sides of the machine.

The legs 12 and 14 are also secured together intermediate their ends by an intermediate frame which is referred to in general by the reference numeral 26. The frame 26, like the frame 16, is rectangular in outline and is secured to the legs 12 and 14.

Secured on top of the side member 24 and extending coextensive therewith is an inwardly and upwardly open, angular cross-sectional guide member 28. The guide member 28 has associated therewith a similar cross-sectional guide member 30 which opens downwardly and inwardly. The relationship of the guide members 28 and 30 will be set forth in detail hereinafter.

Overlying the side frame member 22 is a guide member 32 which is identical in section and function to the guide member 28. Associated with the guide member 32 is a guide member 34 which is identical in section and function to the guide member 30.

Extending transversely of the supporting frame 10 and carried by the guide members 28, 30, 32 and 34 is a plurality of identical rollers which are referred to in general by the reference numeral 36. Each of the rollers 36, as is best illustrated in Figure 7, is elongated and is provided with end portions 38 and 40 of reduced circular cross-section, the end portions 38 being longer than the end portions 40. The end portion 38, as is best illustrated in Figure 6, has mounted on the inner portion thereof a drive sprocket 42. The outer end of the end portion 38 is received in a mounting block or bearing 44. The bearing 44 is seated between the guides 28 and 30 so as to prevent vertical movement of the associated roller 36. Mounted on the end portion 40 of each roller 36 is a mounting block or bearing 46 which is identical with the mounting block 44. The mounting blocks 46 are supported between the guide members 32 and 34 so as to further retain the rollers 36 against vertical movement.

Referring now to Figure 6 in particular, it will be seen that carried by the leg 14 adjacent its intersection with the side frame member 24 is an angular bracket 48. The bracket 48 includes a horizontal flange 50 which has extending therethrough a vertically disposed fastener 52. A mounting bracket 54 similar to the mounting bracket 48 is carried by the other of the legs 14 and carried by the mounting bracket 54 is another fastener 52.

Each of the fasteners 52 includes a head 56 and a removable nut 58. Carried by the upper portion of the fastener 52 and engaging under the head 56 is a coil spring 60. The fasteners 52 serve to retain in place a transverse clamping plate 62 which overlies and retains the guide members 30 and 34 in place. The plate 62 has passed through the end portions thereof the fasteners 52.

The upper portions of the legs 12 are provided with mounting brackets 64 which are identical with the mounting bracket 48 and have carried thereby other fasteners 52. The fasteners 52 serve to retain in place an angular cross-sectional clamp bar 66 which overlies the opposite ends of the guide members 30 and 34 so as to retain the guide members 30 and 34 in mounting block clamping relation.

Carried by the legs 12 and 14 on the end faces thereof are angular mounting brackets 68 which are best illustrated in Figure 3. The mounting brackets 68 have extending therebetween removable rods 70. Removably and pivotally connected to each of the rods 70 is a plurality of spacers 72. The spacers 72 are provided with elongated slots 74 in which the associated one of the rods 70 is positioned. Through the provision of the slots 74, the spacers 72 may be retracted from between the adjacent mounting blocks 44 and pivoted to out-of-the-way positions. The spacers 72 are selectively positioned between adjacent mounting blocks 44 and 46 so as to properly space the rollers 36 so that the desired size of drill may pass therebetween.

In order that the rollers 36 may be retained in their proper positions after the spacers 72 have been inserted, there are carried by the guide members 28 and 32 seats 76 for the mounting blocks 44 and 46 of the roller 36 disposed at the right hand end of the machine, as viewed in Figure 1. Slidably and adjustably received between the guide members 28 and 30, and 32 and 34, are clamp blocks 78, as is best illustrated in Figure 4.

Extending transversely between the legs 14 at the ends thereof is a plate 80. The plate 80 has secured to the inner face thereof a bar 82 which is provided with a pair of internally threaded bores 84 aligned with the clamp blocks 78. Threadedly engaged in the bores 84 is a hollow adjusting clamp 86 which is provided with a turning handle 88.

Received in the clamp 86 at the end thereof adjacent the clamp block 78 is a headed shank member 90 which has received thereon a spring 92 engaging the end of the clamp 86. This permits the resilient retention of the mounting blocks 44 and 46, as well as the spacers 72 in position.

Referring now to Figure 11 in particular, it will be seen that there is carried by the side frame member 24 adjacent the end thereof connected to its associated leg 14 a Z-shaped mounting bracket 94. The mounting bracket 94 supports an idler shaft 96 for an idler sprocket 98. The idler sprocket 98 is disposed in alignment with the drive sprockets 42 of the rollers 36 and in alignment with a drive sprocket 100 of a speed reducer 102. Entrained over all of the sprockets 42, 98 and 100 is a drive chain 104 for simultaneously driving all of the rollers 36 at the same speed. Connected to the speed reducer 102 is an electric motor 106.

As is best illustrated in Figure 2, the electric motor 106 is carried by a supporting plate 108 which is mounted on a pair of extension frame members 110 extending from the legs 12 adjacent the upper ends thereof. The extension frame members 110 are suitably braced relative to the legs 12 by elongated braces 112, the braces 112 extending above the extension frame members 110 and having secured thereto a sheet 114. The sheet 114 is configurated to form a drill receptacle 116 and a drill feed ramp 118.

Referring now to Figures 7 and 9 in particular, it will be seen that each roller 36 is provided intermediate its ends with a plurality of longitudinally spaced, circumferential grooves 120. Each of the grooves 120 has seated therein a finger 122 which is best illustrated in Figure 9. The fingers 122 of each roller 36 are pivotally mounted on an elongated rod 124 which extends the full length of the roller proper, as is best illustrated in Figure 7.

Each of the fingers 122 is gravity actuated to swing into alignment with the space between adjacent rollers 36 as the rollers 36 rotate, as is best illustrated in Figure 9. The swinging of the fingers 122 out of their respective grooves 120 is limited by an abutment shoulder 126 on the finger 122 which engages the reduced cross-sectional core 128 of the roller 36. The extreme outer end of each finger 122 is provided with a seat 130 for engaging a drill, such as the drill 132, to advance the drill from the space between a pair of rollers to a next adjacent space.

In the operation of the sorting and sizing machine, drills are allowed to pass down the food ramp 118 so that they are individually received in the space between the first pair of rollers 36. This space is the smallest space, and the spaces between the rollers 36 progressively increase. If the drill does not pass down through the space between the first pair of rollers, the fingers 122 of the second roller 36 will then engage the drill 132 in the manner illuustrated in Figure 9. As the roller 36 having its fingers 122 in engagement with the drill 132 revolves, as is best illustrated in Figure 10, the drill 132 is moved up and over that roller. Inasmuch as the speed of rotation of the rollers 36 is less than the normal effect of gravity on the drills 132, the drills 132 will fall into the space between the second and third rollers 36 in advance of the fingers 122. The fingers 122 will then fall back into the recesses 120 and clear the drill 132 as they pass by the space in the event the drill 132 does not fall through the space between the second and third rollers 36. This step is repeated until such time as the drill 132 falls between a pair of rollers whose spacing is proper for that size drill, at which time, the drill will pass down between those rollers 36.

In order that the drills 132 passing between adjacent rollers 36 may be collected, there is provided a plurality of chutes 134 and 136. As is best illustrated in Figure 2, the chutes 134 are longer than the chutes 136 and the chutes 134 and 136 are arranged in groups of four, there being first a chute 134 extending to the right, as viewed from the left end of the machine, a chute 136 extending to the left, a chute 136 extending to the right, and then a chute 134 extending to the left. By staggering the chutes 134 and 136, it will be seen that there is provided suitable space for receptacles 138 and 140 which are associated with the chutes 134 and 136, respectively. Since the chute 136 is relatively short, it may be necessary to place the receptacle 140 in a suitable support 142.

As is best illustrated in Figure 1, the individual chutes 134 and 136 are generally channel-shaped in outline. The chutes 134 and 136 are retained in place by elongated rods 142 which extend longitudinally of the supporting frame 10 and are suitably carried by frame members thereof. The rods 142 are removable to permit the removal of the chutes 134 and 136.

The average drill is slightly tapered so that the end of the shank which is to be received in the chuck is of a slightly smaller diameter than the cutting end thereof. As a result, there is a slight tendency for the drills to have the shank end thereof to first attempt to pass between adjacent rollers with the result that the drill will not pass entirely therethrough and the rollers will become jammed. In order to attempt to overcome this, there is provided a modified form of roller which is referred to in general by the reference numeral 144. The rollers 144 are identical with the rollers 36 with the exception that they are provided with a plurality of additional circumferentially spaced grooves 146 so as to form collar-like drill engaging portions 148. The drill engaging portions 148 of adjacent rollers 144 are in staggered relation, as is best illustrated in Figure 12. Inasmuch as the rollers 144 otherwise are identical with the rollers 36 in construction, no further description of the rollers 144 and their operation is believed to be necessary.

From the foregoing, it will be readily apparent that there has been devised a drill sorting and sizing machine which is so constructed whereby the sorting and sizing of drills is accurately accomplished. Further, it will be readily apparent from the foregoing that the sizes of drills to be sorted may be quickly and easily varied by replacing the spacers 72 between the associated mounting blocks 44 and 46. If desired, a plurality of sets of spacers may be continuously mounted on the rods 70 so that the change-over time may be greatly reduced.

From the foregoing, the construction and operation of the device will be readily understood and further explanation is believed to be unnecessary. However, since numerous modifications and changes will readily occur to those skilled in the art, it is not desired to limit the device to the exact construction shown and described, and accordingly, all suitable modifications and equivalents may be resorted to, falling within the scope of the appended claims.

What is claimed as new is as follows:

1. A drill sorting and sizing machine comprising a supporting frame, a plurality of rollers carried by said supporting frame, said rollers being progressively spaced, the rollers being spaced in accordance with the sizes of drills to be sorted, drills being sorted being adapted to pass between said rollers, and means for progressively moving drills from between one pair of rollers to a position between a next pair of adjacent rollers, drive means connected to said rollers for rotating said rollers, the first mentioned means being carried by said rollers, said rollers being provided with spaced circumferential grooves, the first mentioned means being in the form of fingers seated in said grooves and pivotally mounted for projection into said spaces for lifting drills seated between adjacent ones of said rollers.

2. A drill sorting and sizing machine comprising a supporting frame, a plurality of rollers carried by said supporting frame, said rollers being progressively spaced, the rollers being spaced in accordance with the sizes of drills to be sorted, drills being sorted being adapted to pass between said rollers, and means for progressively moving drills from between one pair of rollers to a position between a next pair of adjacent rollers, drive means connected to said rollers for rotating said rollers, the first mentioned means being carried by said rollers, said rollers being provided with spaced circumferential grooves, the first mentioned means being in the form of fingers seated in said grooves and pivotally mounted for projection into said spaces for lifting drills seated between adjacent ones of said rollers, outer ends of said fingers having seats for drills, said fingers being gravity actuated.

3. A drill sorting and sizing machine comprising a supporting frame, a plurality of rollers, said rollers being progressively spaced, the rollers being spaced in accordance with the sizes of drills to be sorted, drills being sorted being adapted to pass between said rollers, and means for progressively moving drills from between one pair of rollers to a position between a next pair of adjacent rollers, mounting blocks supporting opposite ends of said rollers, said mounting blocks being slidably mounted in said supporting frame, spacers positioned between said mounting blocks for properly spacing said rollers, said spacers being removable, rods disposed adjacent said mounting blocks, said spacers being adjustably and pivotally carried by said rods.

4. A drill sorting and sizing machine comprising a supporting frame, a plurality of rollers carried by said supporting frame, said rollers being progressively spaced, the rollers being spaced in accordance with the sizes of drills to be sorted, drills being sorted being adapted to pass between said rollers, and means for progressively moving drills from between one pair of rollers to a position between a next pair of adjacent rollers, drive means connected to said rollers for rotating said rollers, the first mentioned means being carried by said rollers, said rollers being provided with spaced circumferential grooves, the first mentioned means being in the form of fingers seated in said grooves and pivotally mounted for projection into said spaces for lifting drills seated between adjacent ones of said rollers, said rollers being circumferentially grooved intermediate said first mentioned grooves to provide spaced, collar-like drill engaging portions, portions of adjacent rollers being staggered and engaging space being maintained between said collar-like portions whereby drills may pass therebetween.

5. The drill sorting and sizing machine of claim 3 wherein said rollers are provided with spaced circumferential grooves, said means being in the form of fingers seated in said grooves and pivotally mounted for projection into said spaces for lifting drills seated between adjacent ones of said rollers.

6. The drill sorting and sizing machine of claim 3 wherein said rollers are provided with spaced circumferential grooves, said means being in the form of fingers seated in said grooves and pivotally mounted for projection into said spaces for lifting drills seated between adjacent ones of said rollers, said rollers being additionally circumferentially grooved to provide spaced, collar-like drill engaging portions between said fingers, portions of adjacent rollers being staggered and a gauging space being maintained between said collar-like portions whereby drills may pass therebetween.

7. The drill sorting and sizing machine of claim 3 wherein said rollers are circumferentially grooved to provide spaced collar-like drill engaging portions, portions of adjacent rollers being staggered and a gauging space being maintained between said collar-like portions whereby drills may pass therebetween.

8. A drill sorting and sizing machine comprising a supporting frame, a plurality of rollers carried by said supporting frame in side-by-side relation, each of said rollers being circumferentially grooved to provide continuous circumferential ribs, like ribs of adjacent rollers being staggered, said rollers being so dimensioned and so located as to provide spaces of progressively increasing width between the peripheries of said ribs of successive adjacent pairs of said rollers, said widths being determined according to the diameters of drills to be sorted, and means for progressively moving drills from one pair of rollers to a position between a next pair of adjacent rollers.

References Cited in the file of this patent

UNITED STATES PATENTS

| | | |
|---|---|---|
| 446,867 | Haring | Feb. 24, 1891 |
| 1,104,727 | Bell | July 21, 1914 |
| 1,148,066 | Winningham | July 27, 1915 |
| 1,621,695 | Tuite | Mar. 22, 1927 |
| 1,899,737 | Ulrich | Feb. 28, 1933 |

FOREIGN PATENTS

| | | |
|---|---|---|
| 440,407 | Germany | Feb. 5, 1927 |
| 561,515 | Great Britain | May 23, 1944 |